United States Patent [19]
Tap

[11] 3,798,579

[45] Mar. 19, 1974

[54] AFC DEFEAT FOR TELEVISION TUBES

[75] Inventor: Henry H. Tap, Cary, Ill.

[73] Assignee: Oak Industries Inc., Crystal Lake, Ill.

[22] Filed: Jan. 17, 1973

[21] Appl. No.: 324,552

[52] U.S. Cl. .................... 334/52, 74/10.33, 334/53, 334/54

[51] Int. Cl. .................... H03j 5/02

[58] Field of Search .................... 334/51, 53, 57, 54, 52; 74/10.33, 10.45

[56] References Cited

UNITED STATES PATENTS

| | | | |
|---|---|---|---|
| 3,328,700 | 6/1967 | Chipman | 334/53 X |
| R26,777 | 1/1970 | Fulton | 333/51 |
| 3,166,714 | 1/1965 | Dinh Hien | 334/53 X |
| 2,981,838 | 4/1961 | Poskozim | 334/51 X |
| 3,364,753 | 1/1968 | Bidlack | 334/57 X |
| 2,864,946 | 12/1958 | Achenback | 334/51 X |
| 2,920,198 | 1/1960 | Parmet et al. | 334/51 |

*Primary Examiner*—James W. Lawrence
*Assistant Examiner*—Saxfield Chatmon, Jr.
*Attorney, Agent, or Firm*—Parker, Plyer & McEachran

[57] ABSTRACT

An AFC defeat for a television tuner that provides means for defeating an AFC circuit during channel selection and fine tuning.

9 Claims, 6 Drawing Figures

PATENTED MAR 19 1974

3,798,579

AFC DEFEAT FOR TELEVISION TUBES

SUMMARY OF THE INVENTION

The present invention relates to a television tuner and particularly to means for defeating the AFC or automatic frequency control circuit during channel selection and/or fine tuning.

Another object is an AFC defeat switch that provides a contact closure to the AFC circuit during channel selection and fine tuning operations.

Another purpose is a simply constructed, reliably operable AFC defeat mechanism.

Other objects will appear from time to time in the ensuing specification, drawings and claims.

BRIEF DESCRIPTION OF THE INVENTION

Figure 3:
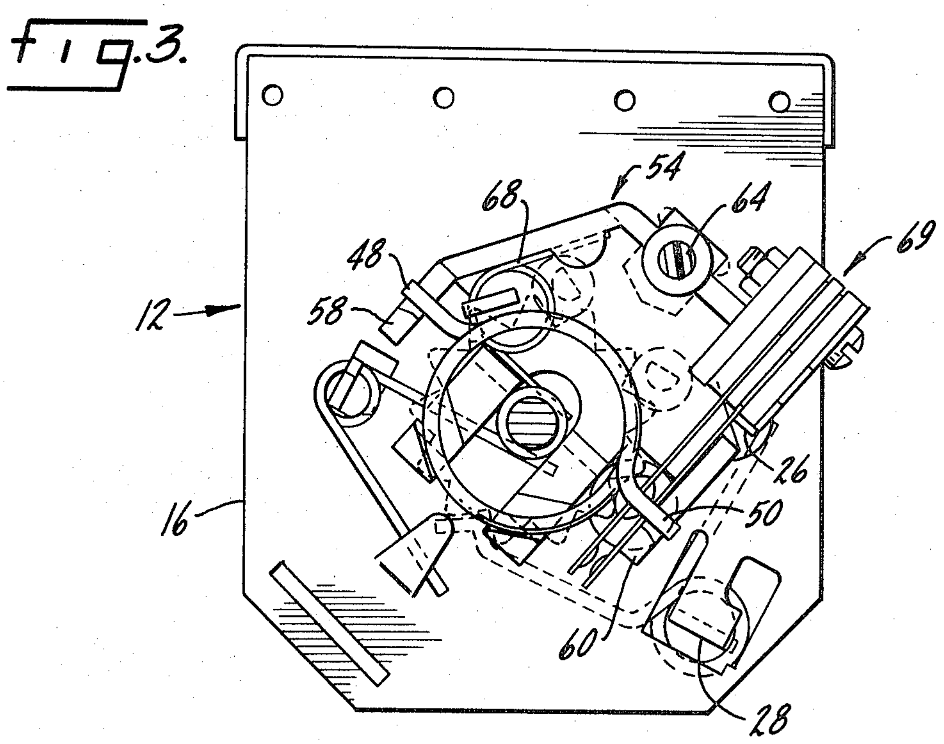
FIG. 3 is a view of the AFC defeat in detail with parts removed.
Figure 4:
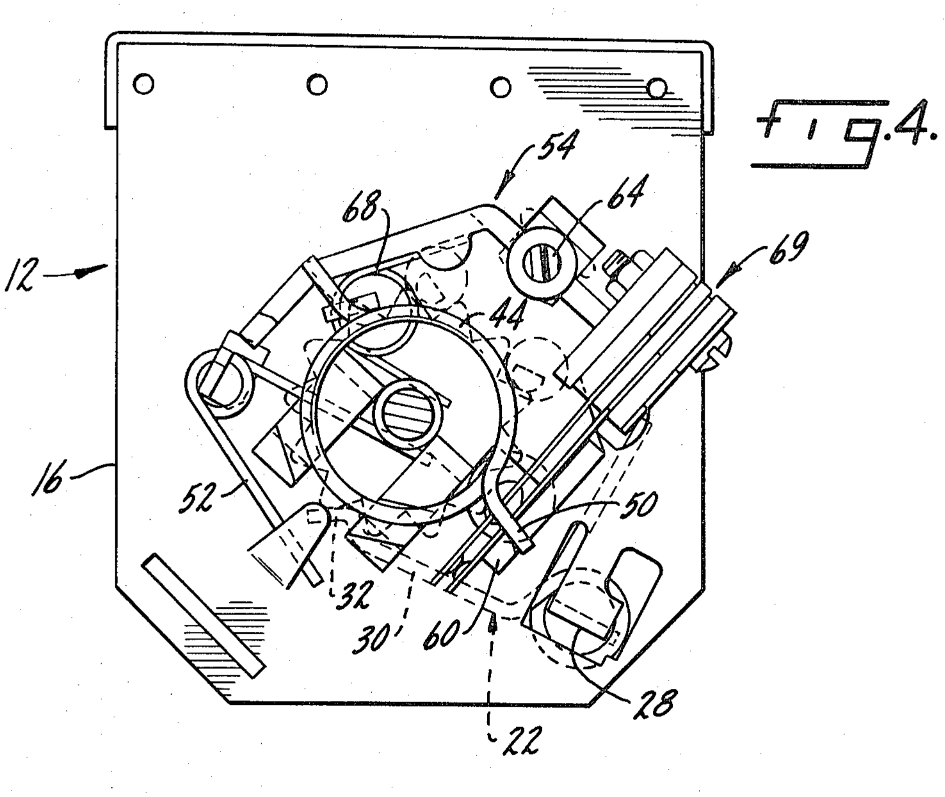
FIG. 4 is a view of the AFC defeat of FIG. 3 in the operated position.

A television tuner 12 conventionally includes a fine tuning mechanism and channel selection means. The channel selection means may include a channel selector shaft 14 that extends through the tuner front plate 16; an index rotor 18 mounted on the shaft 14; an oscillator rotor support 20 also mounted on the shaft 14; and a bias detent spring 22. The channel selector shaft 14 extends past the rotor support 20 into the remaining portion of the television tuner 12, not shown, where it may be supported and operate various rotary switch assemblies. The index or detent rotor 18 has inclined teeth 24 forming a star wheel. The bias detent spring 22 has one spring arm supported by a tab 26 on the front plate 16 (FIG. 3) and the loop or eye of the spring 22 supported by a second tab 28. The other spring arm 30 of the spring 22 has a hook 32 that engages the circumferentially arranged teeth 24 on the detent rotor 18. As the channel selector shaft 14 is rotated by a conventional knob, the spring arm 30 is displaced as the hook portion 32 moves in and out of the teeth 24, thereby providing a detent action.

The oscillator rotor support 20 attached to the shaft 14 includes fine tuning coil slugs 34 in the shape of screws that are circumferentially mounted around the support 20. There is one tuning slug 34 for each channel. These slugs or tuning screws 34 also include a gear shaped head 36 utilized to move the slug in and out of the support 20, as will be explained in detail hereinafter. The tuning slugs 34 form a portion of a conventional tuning coil which is not shown.

The fine tuning mechanism of the television tuner 12 includes a fine tuning shaft 40 that is concentric with and free to rotate about the channel selector shaft 14. A drive gear 42 is attached to the fine tuning shaft 40 and has an axially extending portion 45 which mounts a clutch or torsion coil spring 44 within a groove 46. A spring 52 is mounted between the plate 16 and the channel selector shaft 14. A slider mechanism 54 mounts the AFC defeat 69 and includes a base portion 56 with side edges that are contacted at 58 and 60 by the ends 48 and 50 of the coil spring 44 respectively. Also mounted on the slider mechanism 54 is a fine tuning gear 62 that is engaged by the drive gear 42 and rotatably mounted in the slider by means of a shaft 64 that extends through the slider mechanism base 56 and the tuner plate 16. At the other end of the shaft 64, a tuning gear 66 is provided with teeth adapted to fit the head 36 of the tuning slugs 34. A slider bias return spring 68 is mounted between a portion of the slider base 56 and the selector shaft 14 to return the slider mechanism 54 after it has been displaced by clutch spring 44. Bias spring 52 maintains the channel selector shaft 14 in its normal position.

Figures 1, 2, 5, 6:
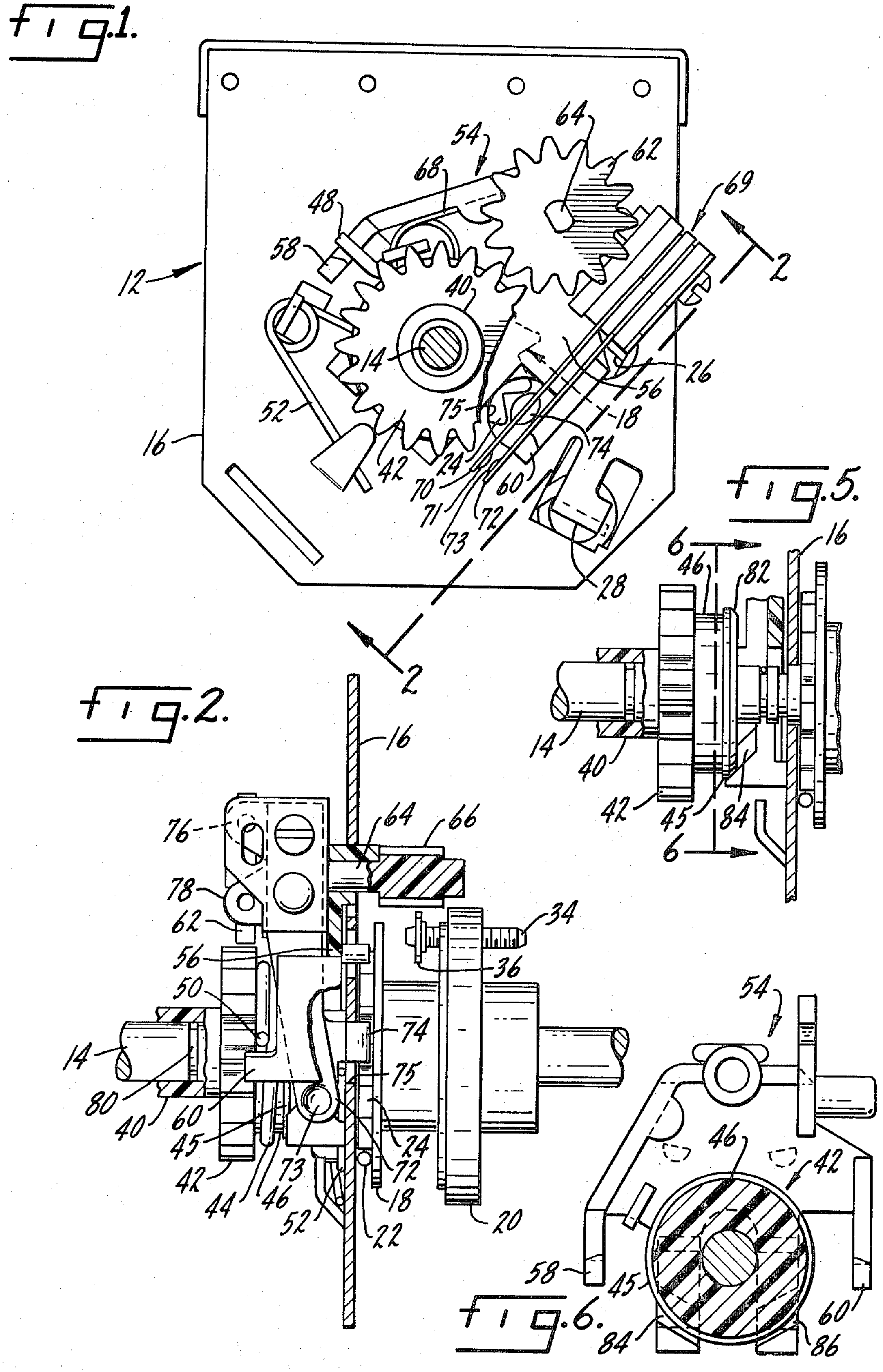
FIG. 1 is a view of the AFC defeat as mounted on a television tuner.
FIG. 2 is a sectional view along line 2—2 of FIG. 1.
FIG. 5 is a view similar to FIG. 2 showing a push to fine tune structure.
FIG. 6 is a sectional view along line 6—6 of FIG. 5.

The AFC defeat 69 which is mounted on the slider mechanism 54 includes spaced contact arms 70 and 72 with one of the contact arms 70 having a small bushing 74 that extends through a hole 75 in the front plate 16. Each contact arm 70 and 72 has a contact 71 and 73 respectively at their ends. The bushing 74 is positioned to be adjacent the teeth 24 of the index or detent rotor 18. With reference to FIG. 1, as the index rotor 18 rotates, the bushing 74 will move up the inclined side of one tooth 24 of the rotor. This movement of the bushing 74 will cause contact arm 70 to close against contact arm 72. The AFC defeat 69 includes connection tabs 76 and 78 for the contact arms 70 and 72 to provide for the connection of suitable wiring means to the AFC circuit.

In operation as the channel selector shaft 14 is rotated by means of a TV viewer turning a suitable knob, the bushing 74 which is positioned between adjacent teeth 24 of the index rotor 18 moves up the inclined side of one tooth which moves contact arm 70 toward contact 72 to provide a closure indication to the AFC circuit. The open position of contact arms 70 and 72 corresponds to the AFC circuit being in the normal operating mode while the closed position of contact arms 70 and 72 corresponds to the AFC defeat position. It can be seen that the bushing 74 will move up the inclined portion of a tooth 24 as the channel selector shaft 14 is rotated regardless of clockwise or counterclockwise rotation. The AFC defeat switch contact 71 and 73 will then close as the channel selector moves through each channel.

Similarly, when the viewer performs the fine tuning operation, it is also desired that the contact arms 70 and 72 provide a closure to defeat the AFC circuit. As the channel selector shaft 14 is rotated between channels, a tuning slug 34 for each channel is positioned near the tuning gear 66. Since the fine tuning on a television channel is done for a particular channel and the fine tuning operation has no effect on the other channels, each channel must be fine tuned individually. Therefore, when the fine tuning is not being performed, the tuning gear 66 must be biased away from the tuning control coil slugs 34. Normally, the drive gear 42 is in such a position that the tuning gear 66 of the slider mechanism 54 is not in contact with any one of the gear shaped heads 36 of the tuning coil slugs 34. As the fine tuning shaft 40 is first rotated, it will turn the drive gear 42 so as to bring either of ends 48 or 50 of spring 44 in contact with the slider base at 58 or 60. If the fine tuning shaft 40 is rotated clockwise, the end 50 of clutch spring 44 will contact the slider base portion 56 at 60. Alternatively, if the fine tuning shaft 40 is rotated counterclockwise, the end 48 of the clutch spring 44 will contact the slider base portion 56 at 58. In either case, the slider mechanism 54 is moved to a position in which tuning gear 66 contacts the gear head portion 36 of the tuning coil slug 34 for the particular selected channel. Further rotation of the fine tuning shaft 40 causes drive gear 42 to engage and turn the fine tuning gear 62. Since the fine tuning gear 62 and the tuning gear 66 are connected by shaft 64, the tuning gear 66 rotates, causing the tuning coil slug 34 to turn. The direction of rotation of the tuning slug 34 is determined by the viewer rotating the fine tuning shaft 40 in a clockwise or counterclockwise direction. The fine tuning shaft 40 is then rotated by the viewer to obtain the desired tuning. The clutch spring 44 in cooperation with the drive gear 42 functions as a slip clutch in that further movement of the fine tuning shaft 40 after the spring end 48 or 50 contacts the slider mechanism 54 merely turns the drive gear 42 within the clutch spring 44.

During the fine tuning operation, the AFC defeat must also be operated. As rotation of the slider mechanism 54 into position to move the slug 34 is accomplished, the bushing 74, moving with the slider, moves up the inclined side of a tooth 24 of the rotor 18. The movement of the slider mechanism 54 to perform fine tuning is sufficient to cause the bushing to move far enough on the inclined surface of a tooth 24 to cause closure of the contact arms 70 and 72. The AFC defeat closure remains until the viewer releases the fine tuning shaft 40.

The AFC circuit is defeated by the shorting of contact arms 70 and 72 during the fine tuning operation, as well as during channel selection. It should be noted that the bushing 74 moves up the inclined surface of teeth 24 regardless of the direction of rotation of the fine tuning shaft 40 and channel selector shaft 14, since the slider mechanism 54 moves in the same direction regardless of the direction of rotation.

The AFC defeat may also be operated by a push to fine tune arrangement, shown in detail in FIGS. 5 and 6. Removal of the clutch spring 44 and a retaining clip, not shown, that fits in a slot 80 of the channel selector shaft 14, converts the fine tuning arrangement of FIGS. 1 through 4 into a push to tune type. Removal of the retaining clip allows axial movement of the fine tuning shaft 40, which also causes movement of the drive gear 42.

The extending portion 45 of the drive gear 42 has a beveled surface 82 that contacts ramp surfaces 84 and 86 of the slider mechanism 54 upon axial movement of the fine tuning shaft 40. The beveled surface 82 moves into a cam relationship with the ramps 84 and 86, causing movement of the slider 54 so as to move tuning gear 66 into contact with the head 36 of the tuning slug 34.

The movement of the slider 54 and the engagement of the tuning slug 34 in the push to fine tune arrangement is identical to that of the rotary fine tuning arrangement utilizing spring 44. Similarly, the AFC defeat 69 mounted on the slider mechanism 54 also is operated in the same fashion as with the rotary fine tuning arrangement. As the fine tuning shaft is moved axially inwardly, the bushing 74, moving with the slider 54, moves up the inclined side of a tooth 24 of the rotor 18. The movement of the slider mechanism 54 during fine tuning is sufficient to cause the bushing 74 to move far enough on the inclined surface of a tooth 24 to cause closure of the contact arm 70 and 72. The AFC defeat closure remains until the viewer releases the fine tuning shaft 40.

It should be noted that, concerning the movement of the slider 54 and the operation of the AFC defeat 69, the only difference between the rotary fine tuning and the push to fine tune arrangements is the means for contacting the slider mechanism 54. In the case of the rotary fine tuning the slider mechanism 54 is contacted at side edges 58 and 60 by the spring ends 48 and 50. The slider mechanism 54 is contacted by the beveled surface 82 of the drive gear 42 at ramp surfaces 84 and 86 during the push to fine tune operation. It should also be noted that the channel selection performed by rotation of the channel selector shaft 14 is identical whether the rotary fine tuning or push to fine tune arrangement is utilized.

Whereas the preferred form of the invention has been shown and described herein, it should be realized that there may be many modifications, alterations and substitutions thereto.

I claim:

1. In a television tuner, a frame, a channel selector shaft mounted in said frame, means for defeating an AFC associated with the tuner including a pair of contacts mounted on said frame and movable between open and closed positions, a detent rotor mounted on said channel selector shaft and having peripherally arranged teeth, a projection fixed to one of said contacts and positioned adjacent said detent rotor teeth such that movement of said rotor moves said one contact to change the electrical condition of said pair of contacts, fine tuning means mounted on said frame, means associated with said fine tuning means for causing movement of said one contact, movement of said channel selector shaft and movement of said fine tuning means both being effective to cause movement of the means fixed to said one contact.

2. The structure of claim 1 further characterized in that said rotor and contacts are positioned on opposite sides of the frame.

3. The structure of claim 1 further characterized in that said contacts are normally open.

4. The structure of claim 1 further characterized in that said means associated with said fine tuning means includes a slider mounted on said frame, movement of said fine tuning means causing movement of said slider with movement of the slider causing movement of the means fixed to said one contact.

5. The structure of claim 1 further characterized in that said fine tuning means is coaxially arranged relative to the channel selector shaft.

6. The structure of claim 1 further characterized by and including a slider positioned on said frame, said pair of contacts being mounted on said slider.

7. The structure of claim 6 further characterized by and including spring means associated with said fine tuning means, movement of said fine tuning means causing said spring means to move said slider.

8. The structure of claim 6 further characterized by and including a beveled shaft associated with said fine tuning means, movement of said fine tuning means causing said beveled shaft to move said slider.

9. The structure of claim 8 further characterized in that said slider includes ramp surfaces, said beveled shaft moving in a cam relationship with said ramp surfaces to move said slider.

* * * * *